United States Patent [19]

Anderson et al.

[11] Patent Number: 5,943,093
[45] Date of Patent: *Aug. 24, 1999

[54] SOFTWARE DRIVER DIGITAL CAMERA SYSTEM WITH IMAGE STORAGE TAGS

[75] Inventors: Eric C. Anderson, San Jose; Mike Masukawa, Los Gatos, both of Calif.

[73] Assignee: Flashpoint Technology, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/718,957

[22] Filed: Sep. 26, 1996

[51] Int. Cl.[6] ............... H04N 5/76; H04N 5/225; H04N 5/235; G03B 7/00
[52] U.S. Cl. ............... 348/232; 348/220; 348/362
[58] Field of Search ............... 348/220, 231, 348/232, 233, 221, 362

[56] References Cited

U.S. PATENT DOCUMENTS

| | | | |
|---|---|---|---|
| 5,018,017 | 5/1991 | Sasaki et al. | 348/221 |
| 5,276,563 | 1/1994 | Ogawa | 348/220 |
| 5,309,243 | 5/1994 | Tsai | 348/362 |
| 5,434,618 | 7/1995 | Hayashi et al. | 348/232 |
| 5,477,264 | 12/1995 | Sarbadhikari et al. | 348/231 |
| 5,495,342 | 2/1996 | Harigaya et al. | 348/207 |
| 5,576,759 | 11/1996 | Kawamura et al. | 348/231 |
| 5,633,678 | 5/1997 | Parulski et al. | 348/231 |
| 5,635,984 | 6/1997 | Lee | 348/333 |
| 5,706,097 | 1/1998 | Shelling et al. | 358/296 |
| 5,828,406 | 10/1998 | Parulski et al. | 348/220 |

*Primary Examiner*—Wendy Garber
*Assistant Examiner*—Alicia M. Harrington
*Attorney, Agent, or Firm*—Sawyer & Associates

[57] ABSTRACT

A method for systematic generation of one or more image groups to relate a plurality of images as a single group includes providing an image command sequence. The image command sequence controls an image capture session comprising one of a plurality of capture types, and further includes a first command, the first command initiating the image capture session and formation of a first group, a plurality of parameters, the plurality of parameters characterizing the first group as one of at least two image capture group formats, and a second command, the second command ending the image capture session, wherein the image command sequence results in the single group of related images, and wherein the related plurality of images are identified through use of the single group. A system includes a digital image capture device, the digital image capture device capable of capturing and processing image data, and a central processing unit within the digital image capture device. The central processing unit capably coordinates an image command sequence, the image command sequence controlling an image capture session and including a first command, the first command initiating the image capture session and formation of a first group, a plurality of parameters, and a second command, the second command ending the image capture session, wherein the image command sequence results in the single group of related images.

21 Claims, 7 Drawing Sheets

SOFTWARE DRIVER DIGITAL CAMERA SYSTEM WITH IMAGE STORAGE TAGS

RELATED APPLICATIONS

The present invention is related to co-pending U.S. patent application, Ser. No. 08/718,956, filed on Sep. 26, 1996, entitled A METHOD AND SYSTEM OF GROUPING RELATED IMAGES CAPTURED WITH A DIGITAL IMAGE CAPTURE DEVICE, and assigned to the assignee of the present invention.

The present invention is also related to co-pending U.S. patent application, Ser. No. 08/721,046, filed on Sep. 26, 1996, entitled METHOD AND SYSTEM FOR CONTROLLED TIME-BASED IMAGE GROUP FORMATION, and assigned to the assignee of the present invention.

The present invention is also related to co-pending U.S. patent application, Ser. No. 08/721,592, filed on Sep. 26, 1996, entitled METHOD AND SYSTEM FOR COHERENT IMAGE GROUP MAINTENANCE IN MEMORY, and assigned to the assignee of the present invention.

FIELD OF THE INVENTION

The present invention relates to digital image data processing, and more particularly to image group formation and control of digital image data.

BACKGROUND OF THE INVENTION

Modern digital cameras typically include an imaging device which is controlled by a computer system. The computer system accesses raw image data captured by the imaging device and then processes and compresses the data before storing the compressed data into an internal memory. The conventional digital camera captures raw image data and then remains unusable until the data is completely processed and stored into internal flash memory.

In capturing raw image data, cameras exist that are capable of performing specific types of image captures. These image capture types include time lapse captures and burst captures. Time lapse captures typically refer to a programmed capture sequence of a particular image over a set time period, while bursts typically refer to a rapid sequence of image captures, i.e., a fast time lapse capture. The images captured in time lapse sequences are thus more related than random, single image captures. Of course, single image captures may also be related, such as when taken in a same locale, during an event, and/qr of the same person(s). Unfortunately, the related images are not usually easily identified as belonging together within a computer system accessing the image data. Further, attempts to manipulate and access these related images as sets are difficult Accordingly, a need exists for easily identifiable image groups of related images, including user-created groups.

SUMMARY OF THE INVENTION

The present invention meets these needs and provides a method and system for systematic generation of one or more image groups to relate a plurality of images as a single group. In a method aspect, the method includes providing an image command sequence. The image command sequence controls an image capture session comprising one of a plurality of capture types, and further includes a first command, the first command initiating the image capture session and formation of a first group, a plurality of parameters, the plurality of parameters characterizing the first group as one of at least two image capture group formats, and a second command, the second command ending the image capture session, wherein the image command sequence results in the single group of related images, and wherein the related plurality of images are identified through use of the single group. The at least two image capture group formats further include natural groups and programmed groups.

In a system aspect, the system includes a digital image capture device, the digital image capture device capable of capturing and processing image data, and a central processing unit within the digital image capture device. The central processing unit capably coordinates an image command sequence, the image command sequence controlling an image capture session and including a first command, the first command initiating the image capture session and formation of a first group, a plurality of parameters, and a second command, the second command ending the image capture session, wherein the image command sequence results in the single group of related images.

With the present invention, related images within a camera are easily identified through the use of image groups. The image groups are conveniently formed through command sequences that further provide parameters for the image groups, including values of tags for group names and group types. The parameters also provide more individualized control and greater flexibility of natural group captures. Further, with an advantageous hierarchical system for storing the groups, coordination of image groups among memory components readily occurs, especially easing management of image files in memory overflow situations.

These and other advantages of the aspects of the present invention will be more fully understood in conjunction with the following detailed description and accompanying drawings.

DETAILED DESCRIPTION

The present invention relates to image group formation for related images captured in a digital image capture device. The following description is presented to enable one of ordinary skill in the art to make and use the invention and is provided in the context of a patent application and its requirements. Various modifications to the preferred embodiment and the generic principles and features described herein will be readily apparent to those skilled in the art Although the following describes aspects of digital image data capture through a digital camera device, it is meant as an illustrative embodiment of the features of the present invention. The present invention is equally capable of utilization with other devices that perform digital image data capture and processing, including, but not limited to, computer systems, including those used to capture digital images accessible from Internet sites and image scanner equipment. Further, the data structures and commands discussed with reference to a preferred embodiment are suitably included as part of high level code used directly by one or more applications that is readily achieved through the use of C, C++, or other similar programming language, and stored on a computer readable medium.

Figure 1:
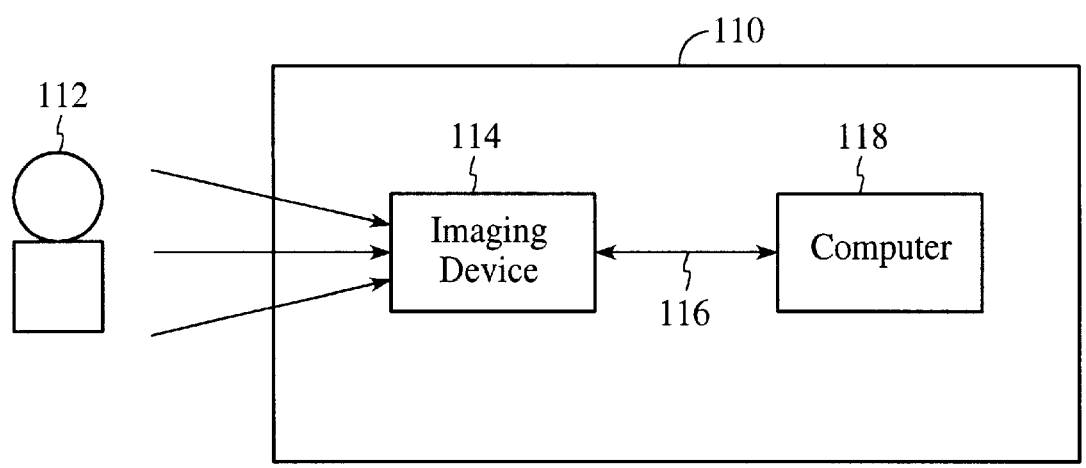
FIG. 1 is a block diagram of a digital camera that operates in accordance with the present invention.

Referring now to FIG. 1, a block diagram of one embodiment of a camera 110 is shown according to the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means (as described more fully with reference to FIGS. 7 and 8 hereinbelow), instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
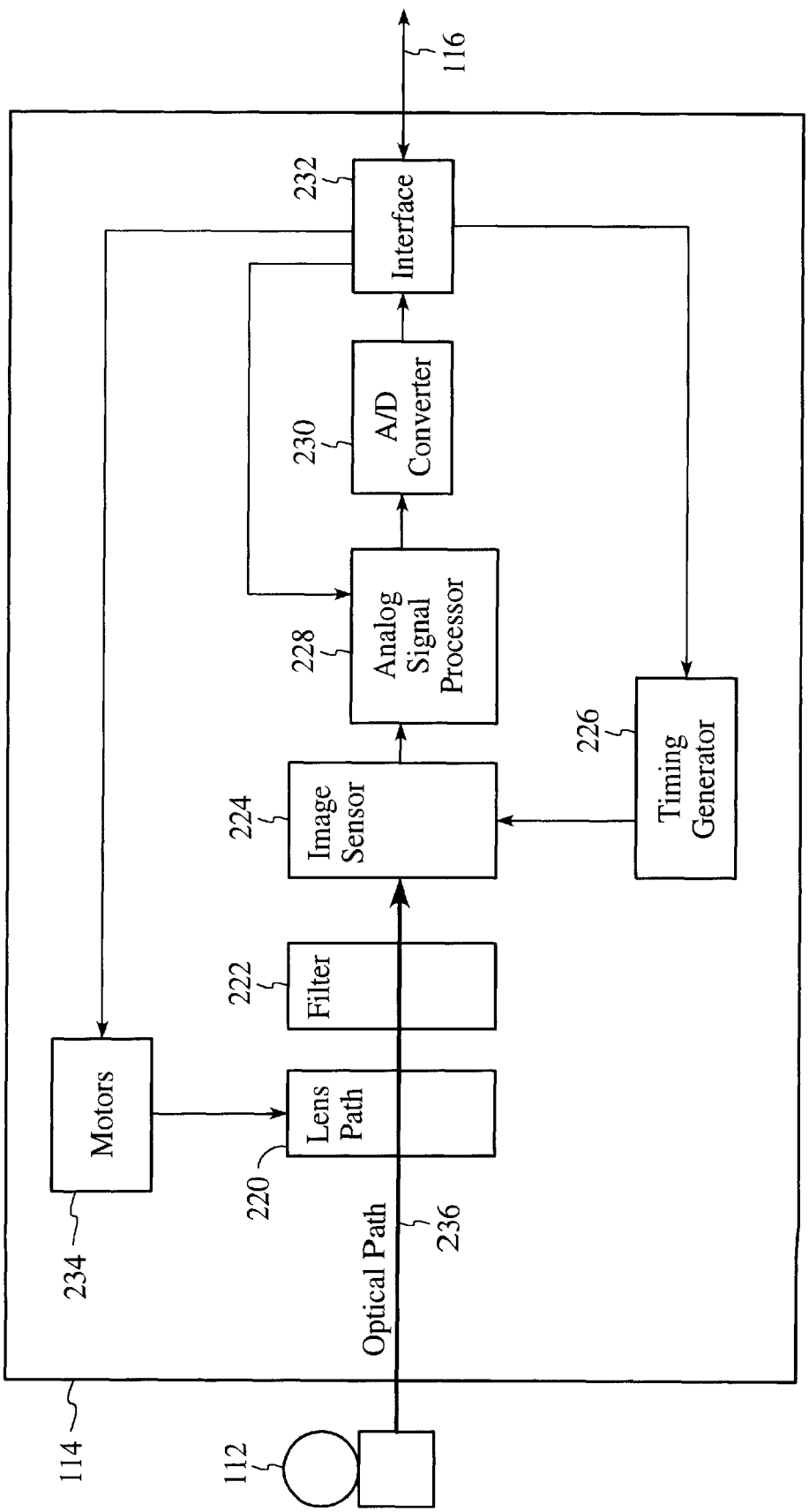
FIG. 2 is a block diagram of the preferred embodiment for the imaging device of FIG. 1.

Referring now to FIG. 2, a block diagram of the one embodiment of imaging device 114 is shown. Imaging device 114 preferably comprises a lens 220 having an iris, a filter 222, an image sensor 224, a timing generator 226, an analog signal processor (ASP) 228, an analog-to-digital (A/D) converter 230, an interface 232, and one or more motors 234.

In operation, imaging device 114 captures an image of object 112 via reflected light impacting image sensor 224 along optical path 236. Image sensor 224 responsively generates a set of raw image data representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
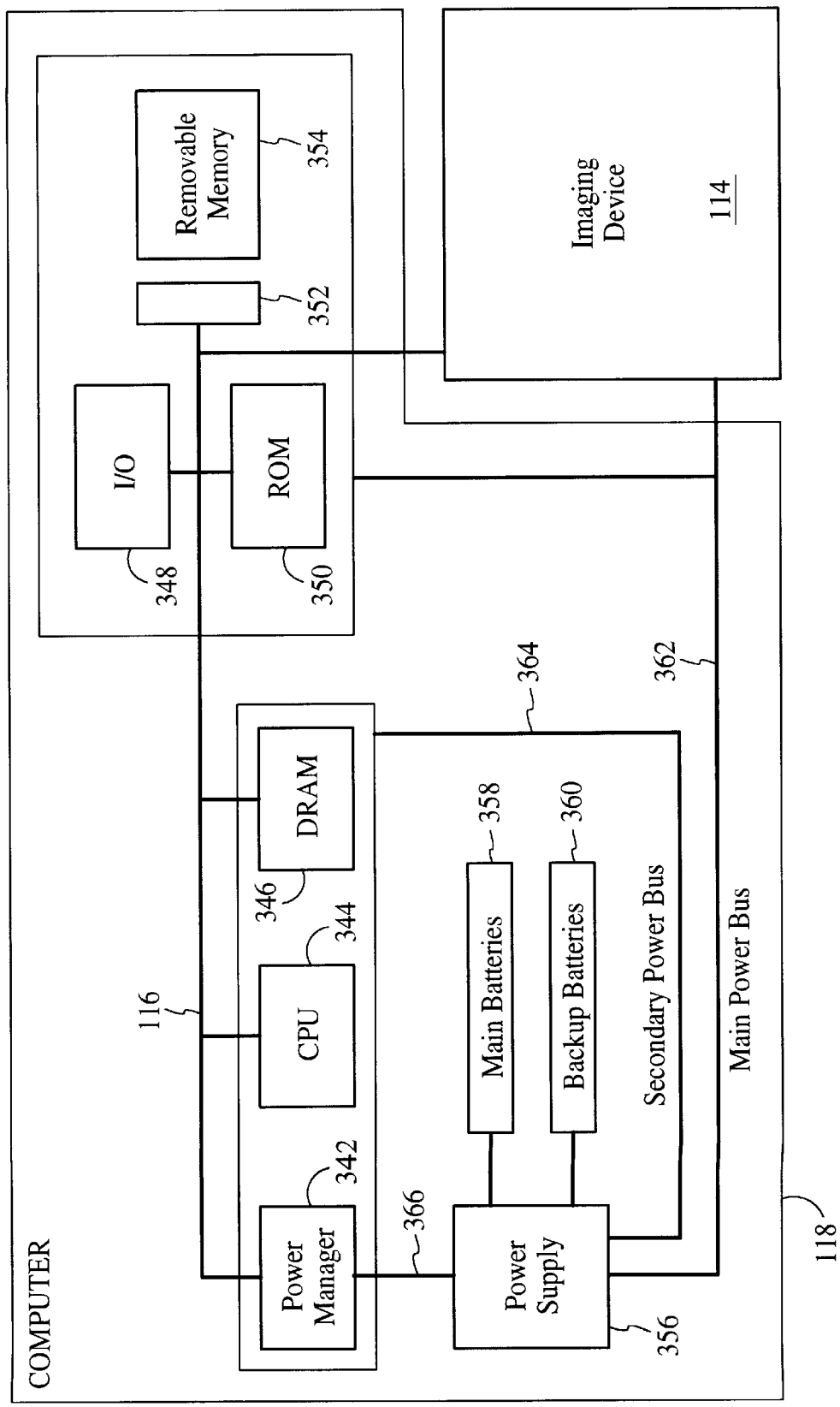
FIG. 3 is a block diagram of the preferred embodiment for the computer of FIG. 1.

Referring now to FIG. 3, a block diagram of the one embodiment for computer 118 is shown. System bus 116 provides connection paths between imaging device 114, power manager 342, central processing unit (CPU) 344, dynamic random-access memory (DRAM) 346, input/output interface (I/O) 348, read-only memory (ROM) 350, and buffers/connector 352. Removable memory 354 connects to system bus 116 via buffers/connector 352. Alternately, camera 110 may be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multi-threading environment DRAM 346 is a contiguous block of dynamic memory which may be selectively allocated to various storage functions.

I/O 348 is an interface device allowing communications to and from computer 118. For example, I/O 348 permits an external host computer (not shown) to connect to and communicate with computer 118. I/O 348 also permits a camera 110 user to communicate with camera 110 via an external user interface and via an external display panel, referred to as a view finder.

ROM 350 typically comprises a conventional nonvolatile read-only memory which stores a set of computer-readable program instructions to control the operation of camera 110. ROM 350 is further discussed below in conjunction with FIG. 4. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk.

Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, ROM 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364.

During a power failure mode in which the main batteries 358 have failed (when their output voltage has fallen below a minimum operational voltage level) the backup batteries 360 provide operating power to power supply 356 which then provides the operating power only to the secondary power bus 364 of camera 110. Selected components of camera 110 (including DRAM 346) are thus protected against a power failure in main batteries 358.

Power supply 356 preferably also includes a flywheel capacitor connected to the power line coming from the main batteries 358. If the main batteries 358 suddenly fail, the flywheel capacitor temporarily maintains the voltage from the main batteries 358 at a sufficient level so that computer 118 can protect any image data currently being processed by camera 110 before shutdown occurs.

Figure 4:
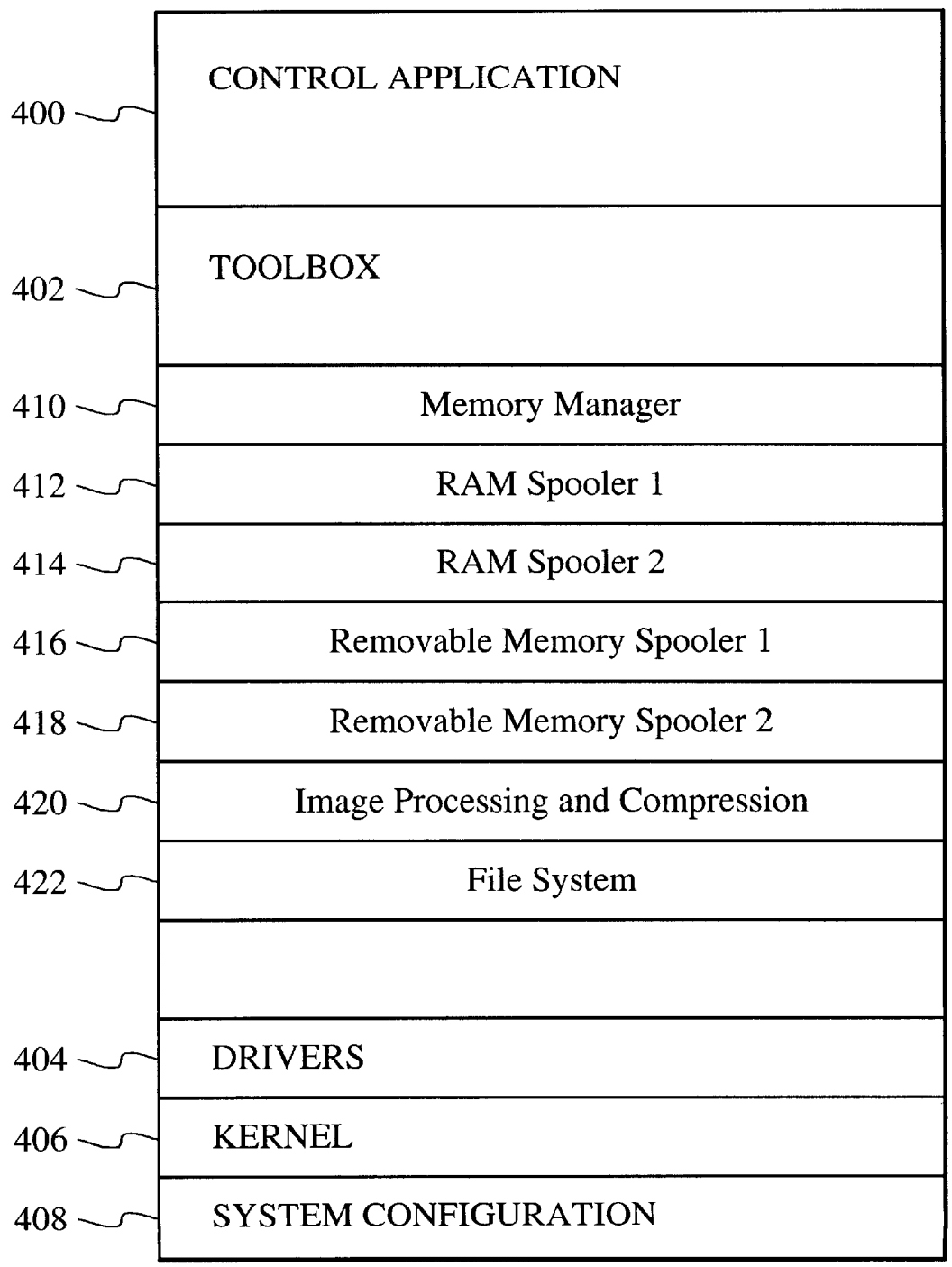
FIG. 4 is a memory map showing the preferred embodiment of the read only memory (ROM) of FIG. 3.

Referring now to FIG. 4, a memory map showing the preferred embodiment of ROM 350 is shown. In the preferred embodiment, ROM 350 includes control application 400, toolbox 402, drivers 404, kernel 406 and system configuration 408. Control application 400 comprises program instructions for controlling and coordinating the various functions of camera 110. Toolbox 402 contains selected function modules including memory manager 410, RAM spooler 1 (412), RAM spooler 2 (414), removable memory spooler 1 (416), removable memory spooler 2 (418), image processing and compression 420 and file system 422.

Figure 5:
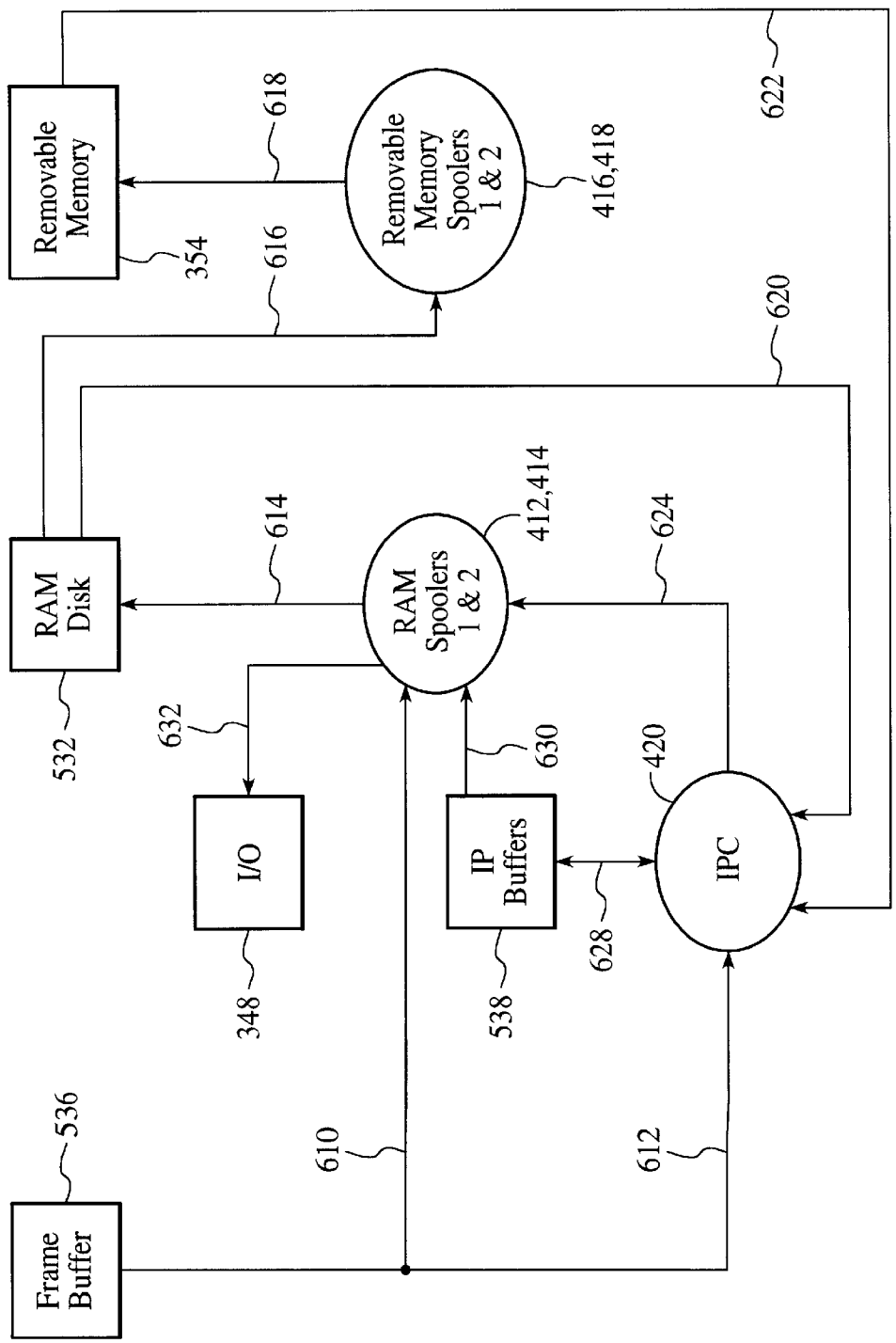
FIG. 5 is a block diagram showing preferred data paths for transmitting image data between components of the FIG. 3 computer.

Referring now to FIG. 5, a block diagram showing preferred data paths for transmitting image data between selected computer 118 components is shown. In FIG. 5, frame buffer 536 receives and stores raw image data previously captured by image device 114. Frame buffer 536 then transfers control of the raw image data to RAM spooler 1 (412) via line 610. Alternatively, if RAM disk 532 is full frame buffer 536 may transfer control of the raw image data directly to image processing/compression 420 using line 612. If RAM spooler 1 (412) receives control of the raw image data, it then stores the raw image data into RAM disk 532 using line 614.

Removable memory spooler 1 (416) may then access the raw image data from RAM disk 532 via line 616 and store it into removable memory 354 using line 618. Alternatively, if removable memory 354 is full or is not inserted, RAM disk 532 may provide the raw image data directly to image processing/compression 420 using line 620. If removable memory spooler 1 (416) stores the raw image data into removable memory 354, then image processing/compression typically accesses the stored raw image data using line 622.

Image data is sometimes related among images captured. As mentioned previously, time lapse image capture sequences/burst image capture sequence represent a form of 'natural' image groups. For purposes of this discussion, natural image groups, as their name implies, preferably refer to sets of images related naturally by the method of capture. Other capture sequences appropriately considered natural groups include synchronized images with sound, and video clips with or without sound. Another type of image group is a programmed group. Programmed groups preferably refer to image groups created by the external host computer or a script within the capture device. Scripts preferably refer to command sequences used to access the functions and features of a capture device when away from a host computer. Programmed groups include panorama sequence groups, exposure autobracket groups, and any other type of user-defined groups. By way of example, user-defined groups include a series of images related by location, such as a real estate agent would produce when taking images of houses and rooms within the houses.

Figure 6:
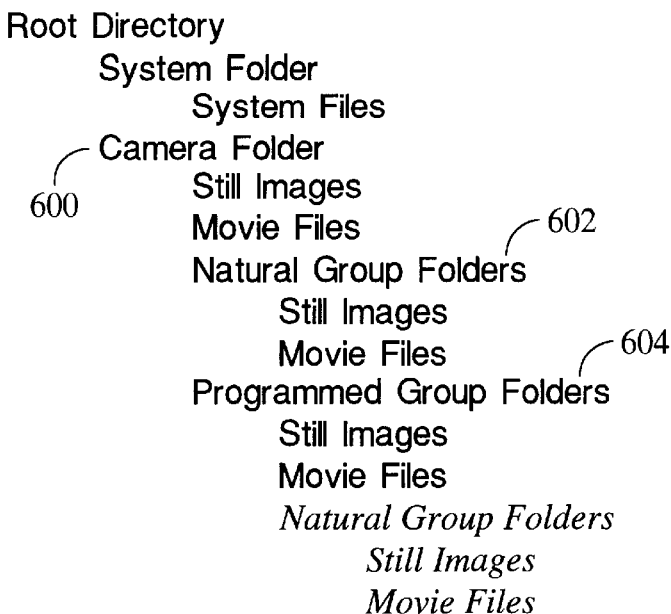
FIG. 6 illustrates a hierarchical system of organizing image groups in accordance with a preferred embodiment.

In a preferred embodiment, a digital camera produces both natural and programmed groups. The image groups preferably form a level in a hierarchical system for organizing images in the camera memory, as shown in FIG. 6. Within the camera folder 600 created from the camera serial number are natural groups 602 and programmed groups 604, each with their own associated folder. The still image files and/or movie files are appropriately located within the folders for each of the natural groups and programmed groups to which they are associated. In addition, in an alternate embodiment, programmed groups may also include a natural group, and thus, a natural group folder is suitably provided within the program group folder in such situations. Capturing of images for each group type is described in more detail hereinbelow with reference to FIG. 7.

IMAGE GROUP FORMATION

Figure 7:
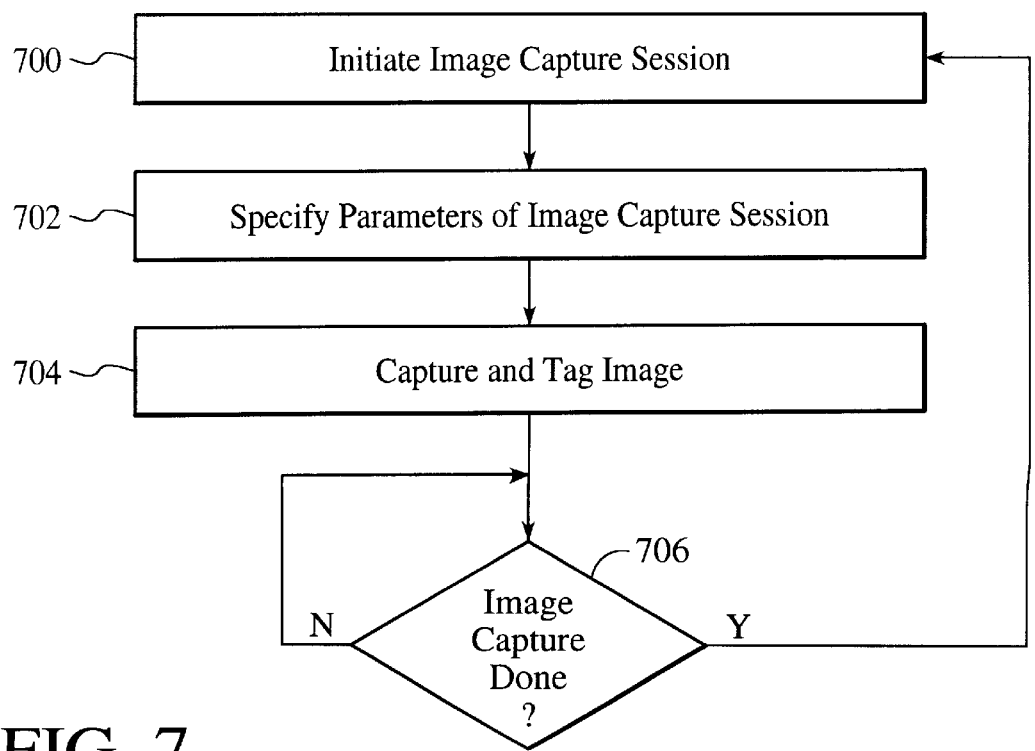
FIG. 7 illustrates a flow diagram of image group formation in accordance with a preferred embodiment.

An image group is preferably formed as illustrated in the flow chart of FIG. 7. Initiation of an image group capture session occurs upon issuance of a command sequence for image group capture (step 700), e.g., via a command such as a StartCapture(CaptureType, CaptureParameters) command. The parameters of the image capture session are also provided (step 702), e.g., via the CaptureType and CaptureParameters specified in the StartCapture command. The parameters specified suitably provide information capable for use as tags for the image files. In an alternate embodiment, a StartCapture command is suitably initiated by the camera control application (400, FIG. 4) upon depressing of the camera's shutter button. Parameters previously stored for the session are then appropriately utilized by the camera.

While grouping related images into folders aids in the identification of related images, individual image files within the folders also are suitably identified by image tags. Image tags preferably provide several indicators, including what type of group the image files form, what position in the sequence of image files each image file represents, and other information to assist in post-processing techniques. For example, post-processing techniques include those used to form a panorama image from a particular image sequence forming a group.

Preferably, the image tags provided include a group type tag. The group type tag suitably identifies whether the image file is part of a natural group, programmed group, a single image, etc. The tags further include a group sequence number tag, where the group sequence number tag contains a number identifying the position of the image file in the sequence of image files formed during the image group capture. Other tags include group data field tags for storing group-specific information. Group specific information for panorama sequences, for example, includes a first group data tag identifying image overlap data, a second group data tag identifying an angle of view for the lens of the camera, and a third group data tag identifying a width of the panorama in degrees, which all aid in the processing for the formation of the panorama image.

Thus, for single still image capture, a '0' value suitably is supplied as the parameter value of the CaptureType, resulting in a tag, such as 'sngl', for the group type tag for the image file. Further, with single image captures not requiring specification of any other parameters, suitably, there are no CaptureParameters. For a live image/viewfinder capture, i.e., to a capture a thumbnail image of exactly what the camera is currently seeing for use by the host in presenting a live viewfinder to the user, a CaptureType value of '1' is suitably used. Since capture of exact and current views include out of focus images, suitably, a parameter 'preview' allows specification of as a Boolean parameter of 'true' or 'false' in the CaptureParameters to indicate whether the live view is to be at a desired setting for a full-size image or is to be at current auto-exposure and auto-focus settings.

For programmed group captures, a CaptureType value of '2' is suitably used, with tagging of the images by the parameters specified in the CaptureParameters. A group type name is preferably specified in the parameters and is suitably stored as the group type tag. A group sequence number for the first image in the group, e.g., an unsigned integer of value '1', is also specified and stored as the group sequence number tag. A parameter for identifying the count sequence as an autocount sequence is preferably also included and set to a true value, e.g., Boolean value '1', for sequentially tagging each image file in the group. A false value suitably sets all file sequence tags for the group to the same value. Parameters for group specific data are also included and used as the data for the group data tags. A name for the group is also capably included in the parameters and stored as the group name tag. The group name appropriately provides the name for the folder holding the image files. When no group name is specified in the parameters, a default name comprising the first two characters of the group type name and the image number of the first image captured in the group and placed into the folder is suitably used.

By way of example, StartCapture(2, "pano", 1, true, 115, 1850, 180, 0), sets up a programmed group for forming a panorama image. The group type tag is specified by the term "pano". A sequence count initiates from the specified value of '1' with autocounting, as specified by the 'true' parameter. The image files stored suitably also include four data tags identifying 115 pixel overlap between images, 18.5° lens angle of view, 180° panorama, and a '0' value. With no group name specified in the parameters, suitably a default name is provided, e.g., PAnnnnnn, where nnnnnn is the image number of the first image of the group.

TIME-BASED IMAGE GROUPS

For natural group captures, the CaptureType is suitably specified as a '3' value. Parameters identified by the CaptureParameters include the group type, e.g., burst or time lapse, for the group type tag. A timer count value is also identified, e.g., an unsigned integer value, specifying the number of images to be captured, i.e., the length of the image capture session. If the count is greater than 1, an initial delay is suitably eliminated, while a count of zero makes the command a no-operation command. A count of '1' results in the group type being tagged as a single image capture and placed as a still image file within the camera folder. Another parameter suitably specified is the timer delay parameter, which identifies an initial delay if the capture is a single image capture, or the time between captures for a time lapse sequence. Suitably, values are specified in 0.01 second increments. A capture size parameter is also preferably identified by an integer value in a range, e.g., from 1–8, which indicates the size reduction during capture. By way of example, legal values of 1, 2, 4, and 8 represent, respectively, reduction sizes of no reduction, ¼, ¹⁄₁₆, and ¹⁄₆₄.

A time lapse group sequence as an example of a natural group initiates with a StartCapture(3, "tlap", 10, 6000, 1) command. With these parameters, the group type tag is "tlap", and the session captures 10 images, one every 60 seconds, with no reduction in size during capture. Although not specifically shown in the example, other parameters capable for inclusion comprise compression level, e.g., a value in a range that indicates a level of desired compression from minimum to maximum. Additionally, auto-exposure, autofocus, and color or black and white indications are also suitably specified, such as with unsigned integer parameter values. The capability to provide such numerous parameters provides greater flexibility for individualized designation and control of time lapse capture sessions.

With each subsequent StartCapture command issuance, the CaptureType value suitably indicates whether the image belongs to an initiated image capture session, e.g., StartCapture(2) suitably indicates that the image captured belongs to the programmed group being formed. Each image is thus suitably captured and tagged (step 704) with each StartCapture command issuance. Preferably, the image capture session is then completed (step 706) when a completion command occurs, such as when an EndCapture (CaptureType) command is generated from the host, when the count gets exhausted in a time lapse sequence, or in the alternate embodiment, when the shutter button is no longer being depressed. When no CaptureType is identified, e.g., EndCapture(), all capture sessions are appropriately terminated. When the CaptureType value is '2', an in-process programmed group capture session is terminated and the group name is returned. An error is suitably returned when there is no in-process programmed group. When a CaptureType value of '3' is identified, an in-process natural group sequence is terminated and the group name is returned. An error again occurs when no natural group sequence is in-process. When other values of CaptureType are specified, an error is returned, and the command has no effect. After completion of an image capture session, other image groups are then suitably formed by repeating the process.

Figure 8:
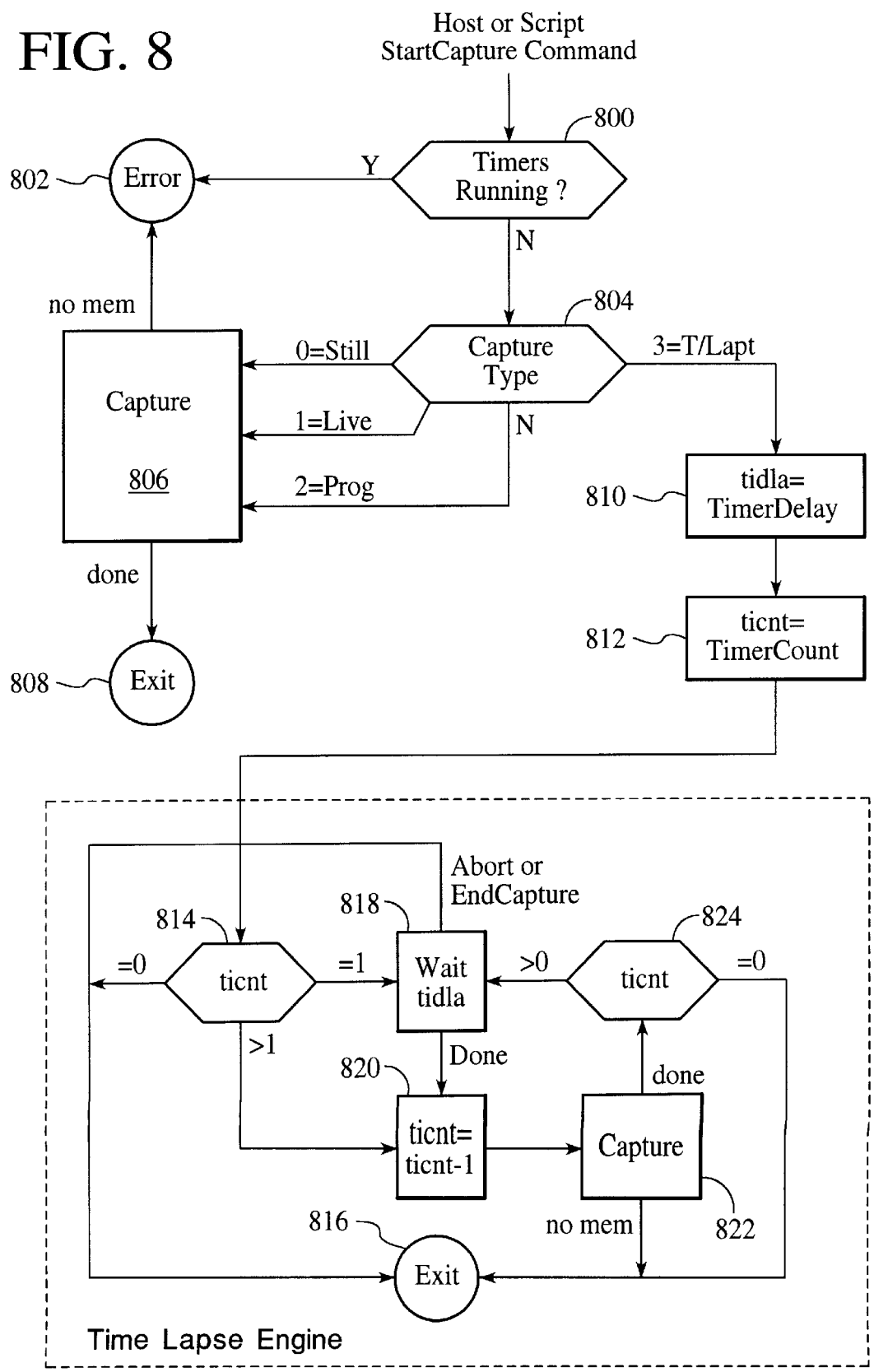
FIG. 8 illustrates a more detailed flow diagram of capture control in accordance with a preferred embodiment.

In terms of controlling captures, FIG. 8 presents a more detailed flow diagram. Upon receipt of a host or script StartCapture command, a determination of whether timers are running is made (step 800), i.e., whether a delay is already in progress for an image capture. If so, an error is signaled (step 802). If not, the CaptureType specified in the StartCapture command is determined (step 804). When the value is '0', indicating a still image is to be captured, a '1', indicating a live/viewfinder image is to be captured, or a '2', indicating a programmed group is to be captured, the process continues with an image capture (step 806). Once the capture is completed, the routine is exited (step 808). When there is no memory available, an error is returned (step 802).

When the CaptureType is a '3', indicating a natural group capture, e.g., a time lapse sequence, the process continues with the setting of two variables, e.g., 'tldla' to hold a specified TimerDelay value from the CaptureParameters of the StartCapture command (step 810), and 'tlcnt' to hold a specified TimerCount value from the CaptureParameters (step 812). A determination of the tlcnt value is made (step 814), and when equal to zero, the process is completed (step 816). When the tlcnt value is equal to 1, the delay as specified in the tldla value is waited (step 818) and the tlcnt is reduced by one (step 820) before an image is captured (step 822). When the tlcnt is greater than 1, the tlcnt value is reduced by 1 (step 820), and an image is captured (step 822). If no memory is available, the process is exited (step 816). Alternatively, when the capture is done, the value of tlcnt is again determined (step 824). When the tlcnt count value has been exhausted, the process is exited (step 816). When the tlcnt count value has not been exhausted, the delay time is again waited (step 818), and the process proceeds as described until an exiting situation occurs. Included in the exiting situations is an abort or EndCapture occurrence. An EndCapture command results from a host, as described previously, while an abort command may occur when power fails, or when another StartCapture command with a different CaptureType occurs to prematurely end an image capture session.

Of course, for a situation in which a natural group is being captured within a programmed group, the issuance of a StartCapture command with a different CaptureType suitably does not end the programmed group capture. Rather, with the preferred EndCapture command definition in which a programmed group is ended by specification of the group type, e.g., EndCapture(2), a natural group is suitably included by issuing a StartCapture (3)/EndCapture (3) sequence within the programmed group session.

COHERENT MEMORY MANAGEMENT OF IMAGE GROUPS

The image group captured during an image capture session preferably forms a level of the hierarchy within the camera memory, as discussed previously. Management of the image grouping for such a hierarchy is complicated by the presence of multiple memory components, including RAM disk 532 (FIG. 5) and memory 354 (FIG. 3). Suitably, with the assumption that the RAM disk 532 is too small to accommodate a complex image grouping system, image files are appropriately stored as a flat hierarchy. An image queue within the DRAM 346 (FIG. 3) capably contains the folder information for the image files, so that image file grouping by tag occurs with folder creation only when the files are moved or spooled from the RAM disk 532 to a removable memory 354. The inclusion of the group name, i.e., the folder name, in the image tags in the files, and in the image queue, ensures that proper creation of the hierarchy readily occurs once a removable memory 354 is inserted.

With a hierarchy on the removable memory 354 and none on the RAM disk 532, proper maintenance of image files in the hierarchy is needed for those situations in which all of the images in a group do not fit on the removable memory 354, and one or more files of the group must then be stored on the RAM disk 532. In a preferred embodiment, an alias file is used within the removable memory 354 hierarchy for each of the image files missing from the removable memory 354. The alias file is preferably zero sectors in size, and has the same name as the missing file, but with a .SUB (for substitute) extension. When the images are subsequently transferred to a host system, the correct image file suitably replaces the substitute file via the user or host software.

Although the present invention has been described in accordance with the embodiments shown, one of ordinary skill in the art will recognize that there could be variations to the embodiment and those variations would be within the spirit and scope of the present invention. For example, the values and value types described for the parameters and command names are illustrative of a preferred approach, and they may be altered to suit particular needs. Accordingly, many modifications may be made by one of ordinary skill without departing from the spirit and scope of the present invention, the scope of which is defined by the following claims.

What is claimed is:

1. A computer readable medium including program instructions for systematic generation by a digital image capture device of one or more image groups to relate a plurality of images as a single group the program instructions for:

receiving a selection of capture types from a user, wherein the capture types include a still capture, a burst capture, and a time lapse capture;

in response to the depression of a shutter button, providing an image command sequence, the image command sequence controlling an image capture session and further comprising:

a first software command, the first software command initiating the image capture session and formation of a first group;

a plurality of parameters, the plurality of parameters characterizing the capture type and a group type for the first group; and a second software command, the second software command ending the image capture session, wherein the image command sequence results in the single group of related images; and storing the single group of related images in the digital image capture device, wherein a plurality of tags are stored with the single group of related images, wherein the plurality of tags comprise tags identifying group types, tags identifying group sequence numbers, and tags identifying group data fields.

2. A method for systematic generation of one or more image groups by a digital image capture device to relate a plurality of images as a single group, the method comprising:

receiving a selection of capture types from a user, the capture types including a still capture, a burst capture, and a time lapse capture;

in response to a depression of the shutter button, providing an image command sequence, the image command sequence controlling an image capture session and further comprising:

a first software command, the first software command initiating the image capture session and formation of a first group;

a plurality of parameters, the plurality of parameters characterizing the capture type and a group type for the first group; and a second software command, the second software command ending the image capture session, wherein the image command sequence results in the single group of related images, and storing the single group of related images in the digital image capture device, wherein a plurality of tags are stored with the single group of related images, wherein the plurality of tags comprise tags identifying group types, tags identifying group sequence numbers, and tags identifying group data fields.

3. The method of claim 2 wherein the group type comprises a natural group and a programmed group, wherein the natural group comprises a set of images related by the capture type, and the programmed group comprises a set of images grouped by program commands within the digital image capture device.

4. The method of claim 3 wherein the plurality of parameters further comprise a period of delay between image captures in the time lapse capture.

5. The method of claim 3 wherein the programmed group further comprise panorama sequences.

6. The method of claim 3 wherein the programmed group further comprise user-defined sequences.

7. The method of claim 3 wherein the programmed group further comprise exposure autobracket sequences.

8. The method of claim 2 wherein the parameter for the group type further comprises a value indicating one of a plurality of capture types.

9. The method of claim 8 wherein a first value indicates a natural group capture.

10. The method of claim 9 wherein a second value indicates a programmed group capture.

11. The method of claim 10 wherein a third value indicates a still image capture.

12. The method of claim 11 wherein a fourth value indicates a live viewfinder capture.

13. The method of claim 2 wherein the second software command further comprises the first software command of another image capture session not allowed to occur during the image capture session and formation of the first group.

14. The method of claim 2, wherein the plurality of capture types include a single still image capture, a live image capture, a natural image group capture, and programmed image group capture.

15. The method of claim 14, wherein the natural image group capture includes one of a burst sequence and a time lapse sequence.

16. The method of claim 14, wherein the programmed image group capture includes one of a panorama sequence group and an exposure autobracket group.

17. A system for systematic generation of one or more image groups to relate a plurality of images as a single group, the system comprising:

a digital image capture device, the digital image capture device capable of capturing and processing image data, the digital image capture device capable of receiving a selection of capture types from a user, wherein the capture types include a still capture, a burst capture, and a time lapse capture; and a central processing unit, the central processing unit within the digital image capture device and capable of providing an image command sequence in response to a depression of a shutter button by the user, the image command sequence controlling an image capture session and further comprising:
  a first software command, the first software command initiating the image capture session and formation of a first group;
  a plurality of parameters, the plurality of parameters characterizing the capture type and a group type for the first group; and
  a second software command, the second software command ending the image capture session, wherein the image command sequence results in the single group of related images, and a storage unit for storing the single group of related images, wherein a plurality of tags are stored with the single group of related images, wherein the plurality of tags comprise tags identifying group types, tags identifying group sequence numbers, and tags identifying group data fields.

18. The system of claim 17 wherein a first value of the parameters indicating the group type indicates a natural group capture, and a second value indicates a programmed group capture.

19. The system of claim 17, wherein the plurality of capture types include a single still image capture, a live image capture, a natural image group capture, and programmed image group capture.

20. The system of claim 19, wherein the natural image group capture includes one of a burst sequence and a time lapse sequence.

21. The system of claim 19, wherein the programmed image group capture includes one of a panorama sequence group and an exposure autobracket group.

* * * * *